L. Miller,
Mower.

No. 20,182 — Patented May 4, 1858

UNITED STATES PATENT OFFICE.

LEWIS MILLER, OF CANTON, OHIO, ASSIGNOR TO C. AULTMAN & CO., OF SAME PLACE.

IMPROVEMENT IN HARVESTERS.

Specification forming part of Letters Patent No. 20,182, dated May 4, 1858.

*To all whom it may concern:*

Be it known that I, LEWIS MILLER, of Canton, in the county of Stark and State of Ohio, have invented certain new and useful Improvements in the Mode of Hanging and Operating the Reels of Harvesting-Machines; and I do hereby declare the following to be a full, clear, and exact description of the construction and operation of the same, reference being had to the accompanying drawings, making a part of this specification, in which—

Figure 1:
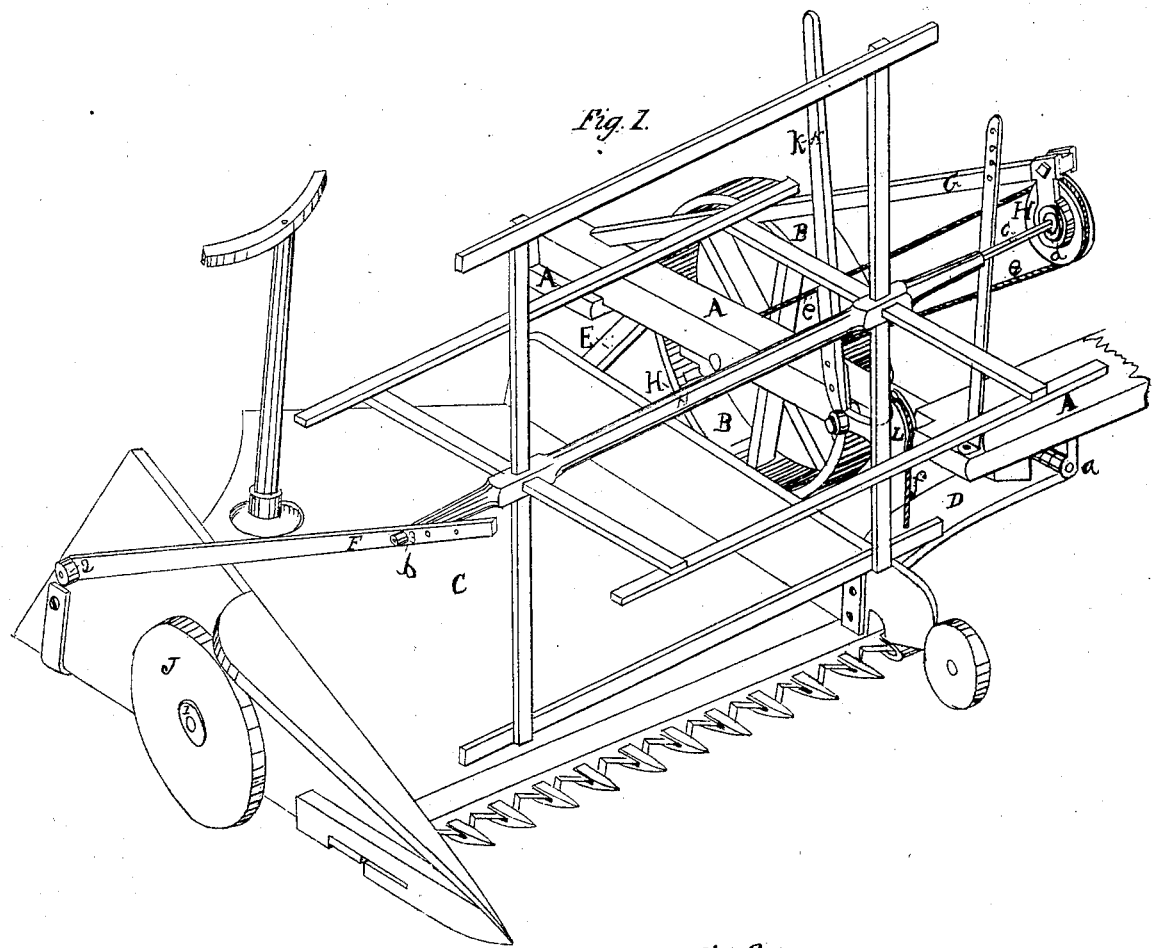
Figure 2:
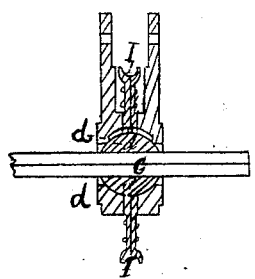

Figure 1 represents a perspective view of the platform and reel connected thereto, and so much of the main frame of the machine as will illustrate the characteristics of the invention. Fig. 2 represents on an enlarged scale a vertical section through the ball-and-socket pulley that receives the long square journal of the reel-shaft.

Similar letters of reference, where they occur in the separate figures, denote like parts of the apparatus in both.

My machine is one of those known as a "combined reaper and mower"—that is to say, a machine which can be converted from a mower to a reaper, or vice versa, while it shall possess the usual requisites of each. To make a perfect mowing-machine the cutter bar or beam should be hinged or jointed to the main frame, while in a reaping-machine the difficulties of such a joint or hinge, unless in some way provided for, would be quite objectionable, as the reel is to be driven ordinarily from the main frame, and has its bearings one on the platform and the other on the main frame. Now, as the reel-posts so arranged must approach and recede from each other as the main frame or the platform (one or both) work on their hinged joint or joints, it is obvious that some peculiar hanging of the reel must be devised that will admit of these movements without affecting its action; and the nature of my invention consists in so hanging and supporting a reel in its posts as that said supports may approach or recede from each other without affecting the rotation of the reel, as will be explained.

To enable others skilled in the art to make and use my invention, I will proceed to describe the same with reference to the drawings.

A represents portions of the main frame, and B one of its supporting and driving wheels. The platform C is hinged to the main frame at its front and rear by the beams or arms D E, said arms being connected to the main frame by hinged joints, one of which is shown at $a$, the other one being similar to it, but not seen in the figure. It is obvious that a platform and main frame so hinged together, and each more or less affected by the inequalities of the ground, must work to or from each other and independent of each other, and that any mutual connection to or with them must have a compensation for these movements. Now, the reel depending upon the main frame and the platform for its perfect action, and crossing, as it were, the joint or hinge between them, though rigid in itself, must be peculiarly constructed not to be injuriously affected by this hinging or folding up. I effect it as follows: F is the outside reel-post, connected to the platform, and G is the inner reel-post, connected to the main frame.

The journal $b$ of the reel-shaft H is supported and rotates in the reel-post F in the usual well-known way; but its other journal, $c$, instead of being round, is square or many-sided and passes through a correspondingly square or many-sided opening through a ball or eye, $d$, that is so arranged in the center of the pulley I as to form therein a ball-and-socket or universal joint, that will maintain the plane of the longitudinal axis of the reel-shaft, regardless of the position of the pulley I, of which it is a part. This universal joint allows the bearings or reel-posts F G to change their relative positions without cramping the reel-shaft or preventing its uniform rotation; but as the reel-posts approach and recede from each other also provision must be made for their retaining the respective journals $b$ $c$ in them. This is done by placing a nut or pin on the one, $b$, and making the other one, $c$, long enough to allow it to slip through the ball-bearing $d$ and still be rotated by the pulley I, which is in effect the same as lengthening and shortening the reel-shaft, as circumstances may require. The ball or eye $d$ is so placed in the center of the pulley I as that it may freely move to accommodate itself to the long journal $c$, but at the same time rotate with said pulley to give the reel its necessary motion.

The reel might be driven from the outside supporting-wheel, J, by a belt passing around its pulley 1 and a second pulley, 2, from which latter another belt may pass around a pulley, 3, on the journal $b;$ or it may be driven directly from the wheel J; but so long as there is a joint between the platform and main frame and one of the reel-posts is on each the ball-and-socket connection, or its equivalent compensating device, must be used, and this connection constitutes the subject-matter of this invention.

The pulley I is driven by a belt, $e$, passing around it and around another pulley on the driving-wheel B.

K is a lever having a segment, L, attached to it, said segment having ratchet-teeth which take against a dog fastened to the main frame for the purpose of holding it at any adjusted position. A cord or chain, $f$, connects the lever and segment to the beam or arm D, by which means the platform can be raised or lowered at pleasure, or adjusted at any suitable height, and then raised above that height by another lever, which is convenient to the driver's seat, and which is fully represented and described in another application of mine for Letters Patent.

There are other devices connected with the platform which are represented in the drawings, but which it is unnecessary here to describe, as those which are new will form the subject-matter of other applications, and the parts which are not new are so obvious as not to require any explanation further than their representation.

Having thus fully described the nature and object of my invention, what I claim therein as new, and desire to secure by Letters Patent, is—

So combining a reel with a platform and main frame that are hinged together as that the raising and lowering of either shall not in any wise injuriously affect the rotation and uniform action of the reel or change its position with regard to the cutters, for the purpose and in the manner substantially as herein described.

LEWIS MILLER.

Witnesses:
LE ANDERSON,
DANIEL GOTSHALL.